Jan. 2, 1968 D. M. OLSON 3,361,439
TOTE BOARD ASSEMBLY
Filed Jan. 12, 1966 2 Sheets-Sheet 2
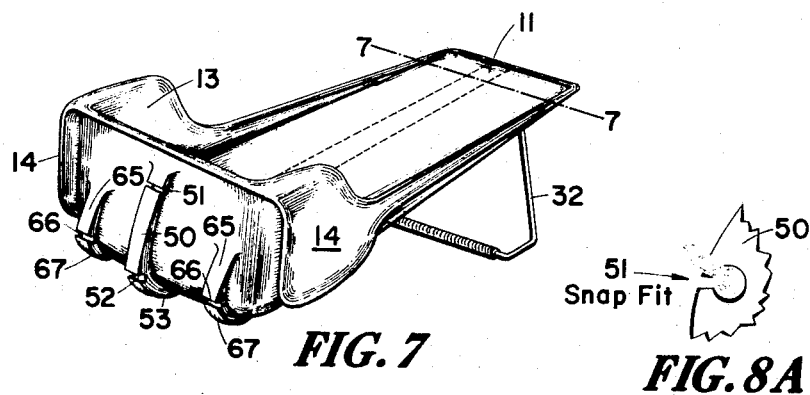
FIG. 7
FIG. 8A
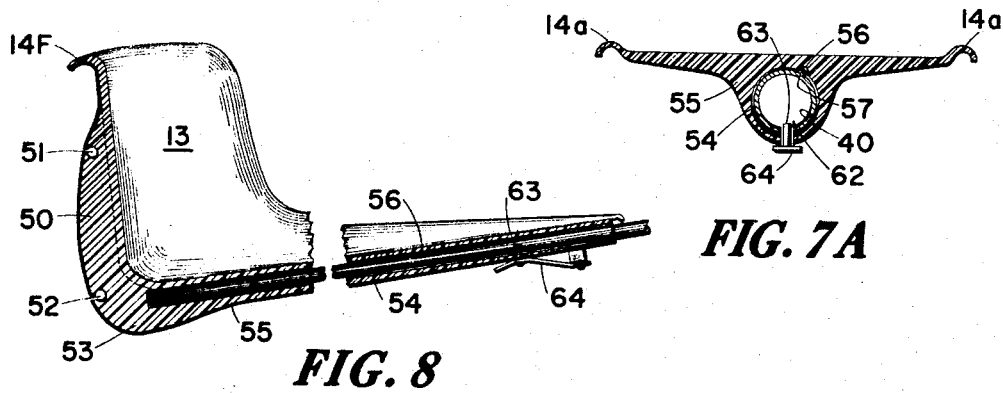
FIG. 8
FIG. 7A
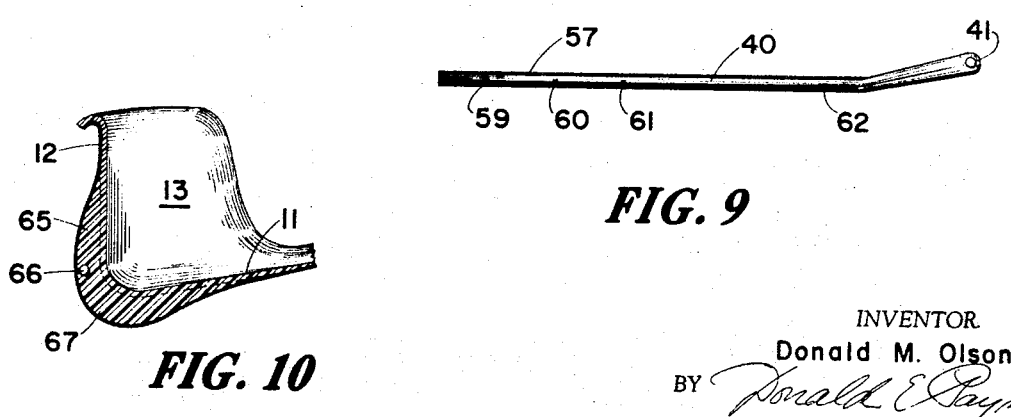
FIG. 10
FIG. 9
INVENTOR.
Donald M. Olson
BY Donald E. Payne
his attorney

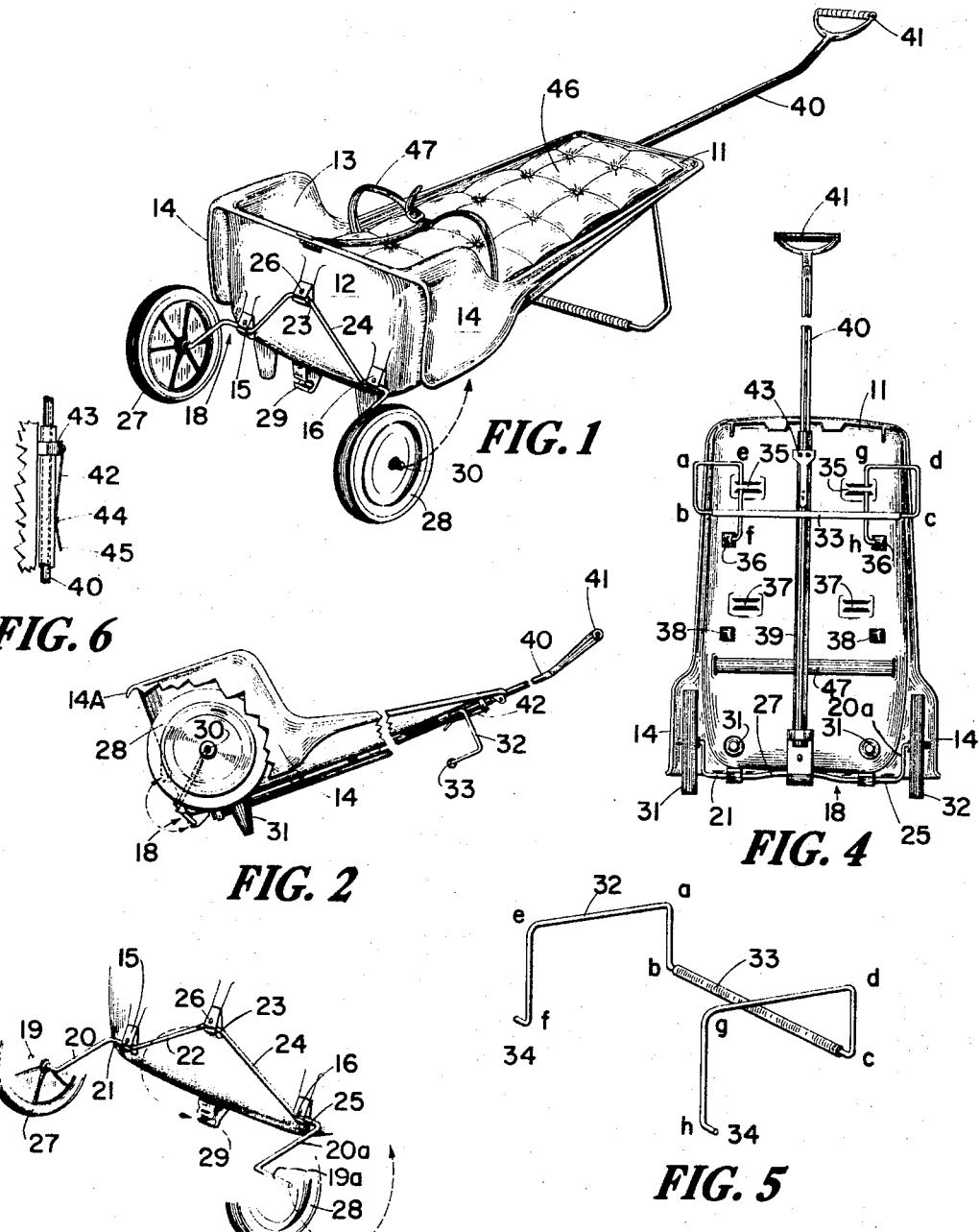

United States Patent Office 3,361,439
Patented Jan. 2, 1968

3,361,439
TOTE BOARD ASSEMBLY
Donald M. Olson, Santa Fe, N. Mex., assignor to Santa Fe National Bank, Sante Fe, N. Mex.
Filed Jan. 12, 1966, Ser. No. 520,186
6 Claims. (Cl. 280—43.1)

ABSTRACT OF THE DISCLOSURE

Baby carrier: reinforced, lightweight bottom, tapered sides, and end with bearings and upper and lower fasteners; a rod with wheels at its ends, bent spacer portions, straight portions mounted in the bearings, and an offset portion selectively held by the fasteners for positioning or retracting the wheels; extensible-retractible handle; and U-shaped holding bracket.

---

This invention relates to a tote board assembly and it pertains more particularly to a device for carrying and holding babies so that the work of mothers may be decreased and the health and comfort of babies may be increased.

It has long been recognized that tote boards enable babies to be held and carried to increase a baby's comfort, but such boards have heretofore been rather cumbersome, adding substantially to the load which a mother must carry and limiting to a great extent the positions which the baby must occupy. An object of this invention is to provide a tote board assembly which will be extremely light without sacrificing strength or rigidity, which will permit a baby to be carried in an inclined seat as well as on a flat board, which may function as a cart or carriage of remarkable springiness when the wheels are operative and the handle is extended, and which may readily be secured to the backs of chairs, car seats and other supports for holding a baby in a comfortable inclined position with its wheels entirely out of the way. Other objects will become apparent as the detailed description proceeds.

Briefly described, my assembly comprises a substantially flat bottom the size of an ordinary tote board, a lower end therefor which may serve as a seat, and sides which are about the height of the end adjacent thereto but which are quite low along most of the bottom edge. The sides are secured to both the end and the bottom and are preferably integral therewith. Means are provided at the lower end for retractibly and rotatably mounting wheels so that in one position they are held in operative position and in the other position they are between the sides and a fender—out of sight and out of the way. The mounting for the retractible handle reinforces and stiffens the bottom, the handle being out of the way when the assembly is used as a tote board and being securely locked in operative position when it is used as a cart. A U-shaped bracket is securable to the bottom to serve as an anti-slip support which acts as a brake for the cart; when the wheels are retracted, this bracket may be hooked over the back of a chair or car seat to provide an inclined bed or seat. The preferred wheel mounting is a bent rod having a central V-shaped portion about 90° offset from the plane of the wheel-supporting portion. Rotation of the V-shaped "snap fit" holding means serves to change the position of the wheels to and from operative position. The inclined legs of the V-shaped portion serve as a stop to keep the rod from sliding from side to side. Portions of the rod serve as a torsion spring to cushion movement of the bottom when the wheels hit a bump.

When the assembly is used as a tote board, pedestals are desirable at the corners of the bottom adjacent to the lower end; this holds the lower snap-fit element off any supporting surface and keeps the board from wobbling.

In my preferred embodiment the bottom, sides, end, fenders, handle support, axle supports and snap-fit elements are all fabricated as one integral casting of high impact polystyrene or equivalent plastic material; a central rib under the bottom is provided with the cylindrical opening for receiving the handle, the portion of this rib which curves up to the lower end may serve as a pedestal, and the upwardly extending portion of the rib on said end contains openings which constitute the snap-fit elements. Other ribs extend from the sides of the lower end around the lower corner and are feathered off on the bottom, these ribs providing the corner pedestals and containing the openings for rotatably supporting the bent rod axle. The U-shaped channel provided by the fenders and the shallow extensions thereof provide additional stiffening for the bottom.

The invention will be more clearly understood from the following detailed description of preferred embodiments thereof, read in conjunction with the accompanying drawings which form a part of this disclosure and in which:

FIG. 1 is an isometric view of my improved tote board assembly.

FIG. 2 is a side view detail showing the wheels retracted.

FIG. 3 is a detailed isometric view of the bent rod axle showing how it functions to place the wheels into a desired position.

FIG. 4 is a bottom view of the assembly shown in FIG. 1.

FIG. 5 is an isometric view of the U-shaped bracket.

FIG. 6 is a detail showing the locking device for the handle.

FIG. 7 is an isometric view of my unitary cast body portion.

FIG. 7A is a detailed section along line 7—7 of FIG. 7.

FIG. 8 is a section through the center of the cast body.

FIG. 8A is an enlarged detail of the snap-fit opening in a rib.

FIG. 9 is a view of the tube carrying the handle.

FIG. 10 is a cross section through one of the corner ribs.

Referring first to FIGS. 1 through 6, my tote board assembly has a bottom 11, about 14 by 28 inches, which is preferably of high impact polystyrene about 3/32 inch in thickness in portions other than reinforcing ribs, etc.

At the front or lower end of the bottom is an end 12 which may be about six or seven inches in height. At each side of the bottom is a side 13, the sides being secured to and preferably integral with the end and bottom respectively. Where the sides 13 meet the end 12 they are of about the same height, but after about six or eight inches they taper off rapidly and along most of the length of the bottom their height is less than an inch. Adjacent each side is a fender 14, the height and shape of which correspond to the height and shape of sides 13. The top of end 12 has an arcuate lip 14A extending from its upper edge.

At the lower sides of end 12 are bearing supports 15 and 16. A rod 18, which in this example is of cadmium-plated mild or cold rolled steel about 1/4 inch in diameter, is bent as shown most clearly in FIG. 3; from wheel-bearing portion 19 there extends at right angles a spacing bar 20, then in the same plane and at another right angle is a straight portion 21 which is held by support 15; next there is a V-shaped portion consisting of inclined portion 22, top portion 23 and inclined portion 24, this V-shaped portion being offset at substantially a right angle from the plane of elements 19, 20 and 21; elements 19a, 20a and 25 correspond to 19, 20 and 21 respectively. When portion 23 is pushed into snap-fit holder 26, wheels 27 and 28 are in operative position as shown in FIG. 1.

When portion 23 is moved as shown in FIG. 3 and snapped into 29, the wheels 27 and 28 are positioned substantially out of sight between sides 13 and fenders 14 as generally indicated in FIGS. 2 and 4. A PAL nut 30 on each end of the axles keep the wheels in place. If fastener 29 projects downwardly and becomes a pivot when the wheels are withdrawn, I may employ pedestals 31 to insure that the bottom will not wobble when the assembly is placed on a flat surface as a tote board.

The U-shaped bracket removeably securable to the bottom is shown in FIG. 5. It consists of a bent rod or tube 32, preferably of a 3/16 inch seamless drawn mild steel tube which is cadmium-plated and which has a metal thickness of about 0.03 inch. Viewed from the end there is a U-shaped portion a–b–c–d, the bottom bar 33 of which is provided with a rubbery non-skid, friction-providing surface so that it acts as a brake when the assembly rests on it with the wheels 27 and 28 in operative position. Viewed from the side there is a U-shaped portion f–e–a–b and a corresponding portion h–g–d–c both of which may be hooked over the back of a chair, car seat or other support. At each end of rod or tube 32 there is a short lug portion 34 outwardly extending from e–f and g–h respectively at right angles thereto and in the plane of e–f–h–g so that e–f and h–g may be slid under offset strips 35 and lugs 34 may enter holes in projections 36 and be held therein by the spring action of the resilient rod or tube 32. One or more additional sets of offset strips 37 and apertured projections 38 may be provided on the bottom 11 so that the assembly may be held at a desired angle from either a high or a low seat-back.

Extending lengthwise on the lower part of bottom 11 is a tubular member 39 which reinforces and stiffens said bottom and also provides a sheath for tube 40, the outer end of which carries handle 41. Tube 40 is keyed to tubular member 39 so that it slides therein without rotation. A flat spring 42 is secured by bracket 43 to tubular member 39 and it carries a detent pin 44 which enters the desired hole in the wall of tube 40 to either hold tube 40 in retracted or in any desired extended position. The end 54 of flat spring 42 is preferably bent slightly upward to permit the finger of a user to easily manipulate it.

In use, a soft quilt or mattress 46 is employed on the upper side of bottom 11 and straps 47 are employed to hold the baby or infant in the desired position. For babies, the assembly is mostly used as a tote board, but one which may be pushed or pulled as a cart. For older infants, the assembly may be used as a car seat or as a stroller with the infant sitting on the end portion 12 with its legs extending over arcuate lip 14A. In either case the wheels can be easily placed in operative position, or they may be withdrawn to the space between the sides and the fenders, said fenders not only acting to hide the wheels but also to keep them out of reach of the infant and to keep dirty wheels from soiling clothes or furniture. The assembly is remarkably strong for its very light weight, it is substantially fool-proof in operation, and for a device of its capabilities, it is quite inexpensive.

In FIGS. 7 to 10, I have shown a preferred body structure for the tote board assembly. Instead of using cement or other fastening means for holding such elements as bearing supports 15 and 16, snap-fit holders 26 and 29, pedestals 31, tubular member 39, etc., all of these elements may be integrally cast along with the bottom, sides, end and fenders to provide a unitary body member as shown in FIG. 7. Here a central reinforcing rib 50 has an upper opening 51 which functions as holder 26, it has a lower opening 52 that functions as holder 29, it has a curved portion 53 that may function as a pedestal, and it has a longitudinal bore or opening 54 in the bottom rib portion 55 for receiving the tube which carries handle 41. The opening 54 may have groove 56 at its periphery for cooperating with a key or spline 58 on the handle-supporting tube which in this example is a tube of 6061–T6 aluminum about ½ inch O.D. with a wall thickness of about .045 inch, said tube having an anodized finish. The splined structure insures that the 1/8 inch holes 59, 60, 61 or 62 will be in alignment with detent pin 63 carried by flat spring 64 (see FIG. 7A). In addition to having the center of the bottom portion reinforced by hollow rib 55, it will be noted that the narrowed portion of the side walls and fenders form channels 14a which reinforce the edges and provide a finger grip for holding the assembly. On each side of the central reinforcing rib 50 there are ribs 65 which extend around the corner of end 12 and bottom 11, and opening 66 in each rib 65 serving as the bearing support and the curved lower part 67 of these ribs serving as pedestals 31. By casting the whole body assembly in one integral unit the structure is reinforced and strengthened, any possible misalignment of parts is avoided, the manufacturing and assembling costs are markedly decreased and the general appearance and utility of the finished product is improved.

In FIG. 8A there is an enlarged view of the push-on or snap holder for straight portions of the axle rod. The diameter of the inner opening is substantially the same as that of the rod itself. The entrance to this inner opening, however, is sufficiently less than the rod's diameter so that material on both sides of the entrance has to be deformed, but should not be deformed beyond the elastic limit of the plastic or other material employed. Usually a tighter fit is used for bearing supports 15, 16 and 66 than are employed for holders 26, 29, 51, and 52.

While my invention has been described in great detail as applied to particular examples, it should be understood that it is not limited to such examples and that alternative arrangements and modifications will be apparent from the above description to those skilled in the art.

I claim:
1. A "tote board" assembly which comprises:
    (a) a bottom stiffened and reinforced by a lower end and by sides, the sides being secured both to the end and to the bottom, and bearing supports adjacent lower portions of the end,
    (b) a rod
        (b¹) whose outer ends provide wheel-bearing portions and wheels mounted on said portions,
        (b²) said rod having spacer-bar portions at about right angles to said wheel-bearing portions and extending to
        (b³) bearing portions designed to fit in said bearing supports, the wheel-bearing portions, spacer-bar portions and bearing portions being in a single plane,
        (b⁴) a bent portion of the rod between the bearing portions, said bent portion being at a substantial angle to said plane,
    (c¹) a first holder for securing the bent portion in a first fixed position whereby the wheels are in extended, operative position and the spacer-bar portions and bearing portions of the rod provide spring elements to cushion the upper part of the assembly when the wheels hit a bump,
    (c²) a second holder, alternative to said first holder, for securing the bent portion in a second fixed position whereby the wheels are retracted into an area substantially coextensive with said sides and are in inoperative position, and
    (d) a U-shaped bracket securable to the lower side of the bottom, the lower bar of the U-shaped bracket having an anti-friction surface to serve as a brake when rested on a supporting surface with the wheels in operative position, and the bracket being adapted to hook over the back of a seat and to serve as a support for holding the bottom in an inclined position when the wheels are in inoperative position.
2. The assembly of claim 1 which includes:
    (e) a handle designed to be in either extended or retracted position,

($e^1$) means for holding the handle below said bottom whereby said bottom is reinforced and stiffened when the handle is in retracted position, and ($e^2$) means for locking the handle in at least one extended position.

3. The assembly of claim 2 which includes for co-operation with the rod:

(f) a pair of firm, snap-fit bearings, one adjacent each side of the lower end for permanently holding the bearing portions of the rod in rotatable position, and (g) a snap-fit holder mounted on an intermediate portion of the end substantially higher than the snap-fit bearings, and a second snap-fit holder mounted below the snap-fit bearings the same distance as the first named snap-fit is mounted thereabove so that the bent portion of the rod may be selectively held by said snap-fit holders.

4. The assembly of claim 3 which includes:

(h) pedestals at each lower corner of the bottom to provide a firm support for the bottom when the wheels are retracted to inoperative position.

5. The assembly of claim 3 which includes:

(i) fenders extending from the upper and forward portions of the sides and substantially covering the wheels when they are retracted to inoperative position.

6. The assembly of claim 3 wherein the U-shaped bracket is:

(j) a resilient rod which is U-shaped when viewed from the end of the assembly and also is U-shaped when viewed from the side thereof, (k) each top end of the resilient rod being bent at an angle of about 90° to be held by spring tension in lug apertures, (l) the bottom of the assembly being provided with apertured lugs and also with offset retainer strips for securely holding the bracket in position.

References Cited
UNITED STATES PATENTS

| | | | |
|---|---|---|---|
| 2,047,485 | 7/1936 | McBrady. | |
| 2,416,752 | 3/1947 | Hendrick. | |
| 2,551,040 | 5/1951 | Newell | 280—414 |
| 3,206,247 | 9/1965 | Johnson | 297—254 |
| 3,207,528 | 9/1965 | Hasche | 280—47.38 |

BENJAMIN HERSH, *Primary Examiner.*

C. C. PARSONS, J. SIEGEL, *Assistant Examiners.*